(12) United States Patent
Brennenstuhl et al.

(10) Patent No.: US 11,007,633 B2
(45) Date of Patent: May 18, 2021

(54) HANDHELD POWER TOOL

(71) Applicant: Robert Bosch GmbH, Stuttgart (DE)

(72) Inventors: Jens Brennenstuhl, Albershausen (DE); Heiko Roehm, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 260 days.

(21) Appl. No.: 15/776,616

(22) PCT Filed: Nov. 7, 2016

(86) PCT No.: PCT/EP2016/076781
§ 371 (c)(1),
(2) Date: May 16, 2018

(87) PCT Pub. No.: WO2017/089100
PCT Pub. Date: Jun. 1, 2017

(65) Prior Publication Data
US 2018/0354118 A1    Dec. 13, 2018

(30) Foreign Application Priority Data

Nov. 24, 2015  (DE) .......................... 102015223144.5
May 11, 2016   (DE) .......................... 102016208126.8

(51) Int. Cl.
*B25F 5/02* (2006.01)
*H01M 10/42* (2006.01)
*B25B 21/00* (2006.01)

(52) U.S. Cl.
CPC ............. *B25F 5/02* (2013.01); *H01M 10/425* (2013.01); *B25B 21/007* (2013.01); *H01M 2010/4278* (2013.01)

(58) Field of Classification Search
CPC ................... B25F 5/02; H01M 10/425; H01M 2010/4278; B25B 21/007
(Continued)

(56) References Cited

U.S. PATENT DOCUMENTS 2,373,542 A * 4/1945 Clark .......................... 244/216
2,383,379 A * 8/1945 Forss .......................... 173/217
(Continued)

FOREIGN PATENT DOCUMENTS

CN    1466022 A    1/2004
CN    1517182 A    8/2004
(Continued)

OTHER PUBLICATIONS

International Search Report dated Apr. 10, 2017 of the corresponding international Application PCT/EP2016/076781 filed Nov. 7, 2016.

*Primary Examiner* — Michelle Lopez
(74) *Attorney, Agent, or Firm* — Norton Rose Fulbright US LLP; Gerard Messina

(57) ABSTRACT

A handheld power tool includes a housing having a handle, a drive motor situated in the housing, and a first interface, the interface being designed to receive pieces of information from at least one second external interface and/or to transmit them to at least one second external interface. The housing has a receptacle opening, the first interface being situated so it is removable in the receptacle opening. Furthermore, the receptacle opening is detachably closable by a cover, the cover locking up the housing toward the outside.

28 Claims, 7 Drawing Sheets

(58) Field of Classification Search
USPC .......................................................... 173/217
See application file for complete search history.

(56) References Cited

U.S. PATENT DOCUMENTS

| | | | |
|---|---|---|---|
| 8,919,456 B2* | 12/2014 | Ng | B25B 23/147 173/11 |
| 2004/0182587 A1* | 9/2004 | May | B25B 23/1405 173/2 |
| 2011/0003504 A1 | 1/2011 | Rejman | |
| 2012/0292070 A1 | 11/2012 | Ito et al. | |
| 2014/0159662 A1* | 6/2014 | Furui | B25F 5/00 320/112 |
| 2014/0326477 A1 | 11/2014 | Thorson et al. | |
| 2018/0345474 A1* | 12/2018 | Brennenstuhl | B25F 5/02 |

FOREIGN PATENT DOCUMENTS

| | | |
|---|---|---|
| CN | 204542075 U | 8/2015 |
| DE | 4204420 A1 | 8/1993 |
| DE | 102010041278 A1 | 3/2012 |
| DE | 102012105483 A1 | 12/2013 |
| EP | 2072192 A1 | 6/2009 |
| EP | 2628427 A2 | 8/2013 |
| FR | 2916320 A1 | 11/2008 |
| JP | 2009023069 A | 2/2009 |
| JP | 2010515594 A | 5/2010 |
| WO | 2007058596 A1 | 5/2007 |
| WO | 2015061370 A1 | 4/2015 |

\* cited by examiner ial Pat. App. No. PCT/EP2016/076781 filed Nov. 7, 2016, and claims priority under 35 U.S.C. § 119 to DE 10 2015 223 144.5, filed in the Federal Republic of Germany on Nov. 24, 2015, and to DE 10 2016 208 126.8, filed in the Federal Republic of Germany on May 11, 2016, the content of each of which are incorporated herein by reference in their entireties.

FIELD OF THE INVENTION

The present invention relates to a handheld power tool.

BACKGROUND

Known electrical handheld power tools are supplied with power via a mains connection. Alternatively, battery-powered devices enable a high level of flexibility during work, since they are independent of the mains current in particular. Outside work can also be carried out conveniently in this manner, for example, so that battery packs are often used in operation of a handheld power tool.

Such battery packs are known to have rechargeable batteries, for example, a plurality of battery cells connected in a parallel and/or a series circuit. Within the scope of this application, a battery pack is therefore to be understood as a battery pack preferably including multiple electrically interconnected battery cells, which can store electrical energy and supply the energy required for the operation of a handheld power tool. Three cylindrical lithium-ion cells connected in series, each having 3.6 V, for example, can be provided for a total voltage of 10.8 V, for example.

Handheld power tools are known from the related art, which use a communication interface in the form of an infrared transmission device, for example, for transmitting data, parameters, or the like. Corresponding data are exchangeable between handheld power tools and an external interface by this infrared transmission device.

SUMMARY

It has proven to be disadvantageous that such infrared transmission devices are only usable to a limited extent, since, on the one hand, obstructions can be situated between the handheld power tool and the external interface, which prevent transmission, or a movement of the user at least temporarily interrupts the corresponding connection. Moreover, such an infrared connection is only usable for limited ranges. In the case of permanently integrated infrared transmission devices, it has proven to be disadvantageous that a replacement of the infrared transmission devices is often not possible and/or the replacement process is complex and costly.

An object of the present invention is to improve the above-mentioned disadvantages and to provide a handheld power tool, e.g., as mentioned above, in which a transmission of data, parameters, or the like from and to an external control unit is reliably enabled using simple construction expenditure even over greater distances and at the same time an adaptation to other conditions with respect to a corresponding connection between the handheld power tool and an external control unit can be provided rapidly and easily.

Furthermore, it is an object of the present invention to provide a handheld power tool in which, with little expenditure, a communication interface for a handheld power tool can be provided, installed, and replaced, where the installation and/or the replacement process is to be able to be carried out preferably simply and cost-effectively.

According to an example embodiment of the present invention, a handheld power tool includes a housing having a handle, a drive motor situated in the housing, and a first interface designed to receive pieces of information from at least one second external interface and/or to transmit them to at least one second external interface. The housing has a receptacle opening, the first interface being situated in the receptacle opening so it is removable. Furthermore, the receptacle opening is detachably closable by a cover, the cover locking up the housing toward the outside. In this way, the first interface can be detachably attached to the handheld power tool, the receptacle opening enabling a simple and cost-effective replacement of the interface situated in the housing of the handheld power tool.

The handheld power tool furthermore advantageously has a control unit inside the housing. The control unit can be in contact, on the one hand, with the drive motor and/or with the transmission and/or with a battery pack electronics unit of a battery pack and, on the other hand, can be in electronic and/or mechanical contact with the first interface and receive and/or transmit pieces of information from the interface.

The interface housing is formed in one piece with the housing of the handheld power tool. The interface housing advantageously forms the receptacle opening directly in the housing wall of the handheld power tool, the receptacle opening being able to be designed as pot-shaped or box-shaped having a circumferential side wall and a bottom surface. It is advantageous in particular that a pot-shaped receptacle opening has a nearly circular opening, which additionally reinforces the housing of the handheld power tool, which is basically weakened by the opening. The bottom surface furthermore has at least one opening for feeding through connecting elements, for example, at least one electrical line, in the direction of other electrical components, for example, the control electronics unit and/or the battery pack electronics unit. Alternatively or additionally, it is conceivable that such an opening is formed in the area of the side wall.

Alternatively, the interface housing can be formed in two pieces with the housing of the handheld power tool and an interface housing for accommodating the interface can be situated in the receptacle opening. In one particularly preferred example embodiment, the interface housing forms an independent module with the interface and the cover, which is introducible in a detachable manner inside the receptacle opening. In particular, the cover and the interface housing can be designed in one piece, alternatively also in two pieces, the module being inserted into the receptacle opening of the handheld power tool and detachably fastened, for example, by a screw connection between the receptacle opening and the interface housing, or by other connecting elements. In this way, the entire interface is formed particularly compactly and can be installed, replaced, and/or retrofitted rapidly and easily in the handheld power tool. In this way, a replacement and/or a repair can also take place rapidly, easily, and cost-effectively.

The interface housing can be fastened in the housing of the handheld power tool or alternatively can also be inserted into the receptacle opening and can be held solely with the aid of the cover in the receptacle opening. The interface is preferably situated largely without play, for example, with the aid of a click connection in the receptacle opening, in such a way that no rattling noises or the like can arise and unintentional loosening of the interface is also prevented during operation. Furthermore, it is advantageous if the receptacle opening and the interface housing are designed in such a way that the introduction of the interface can only take place in one way, so that an incorrect installation of the contact board or the interface within the receptacle opening of the handheld power tool can be reliably prevented.

The cover is advantageously curved in such a way that it follows the contour of the housing wall and terminates flush therewith. The cover can be made of various plastic materials, for example, polyamide 6, polyamide 66, PC (polycarbonate), ABS (acrylonitrile-butadiene-styrene copolymer), or a material mixture of various plastics, and/or can be glass-fiber reinforced. The cover is preferably made of the same material as the housing of the handheld power tool.

To enable a secure but simple access to the receptacle opening and the interface situated therein, it is advantageous if the cover is detachably locked rotationally, in particular via a screw cap or a bayonet fitting. Another specific embodiment is a cover mounted so it is pivotable about a pivot axis, which can be detachably locked on the housing on the side of the cover opposite to the pivot axis by latching, screwing, clamping, or interlocking. In this way, the possible falling of the cover off of the housing or losing of the cover can be effectively counteracted. The cover can furthermore have a slotted depression, whereby simple opening of the cover can take place with the aid of a coin or a screwdriver. The bayonet fitting can be easily operated and nonetheless ensures a secure closure of the receptacle opening. Additionally or alternatively, the cover can also be fastened on the housing with the aid of at least one connecting element, in particular with the aid of at least one screw.

In an example embodiment, the receptacle opening is situated in the area of the handle. The handle is used as a support surface for a hand of an operator of the handheld power tool and generally has a longitudinal axis y, a front side which faces along an axis x in the direction of the tool receptacle, a rear side, and two lateral surfaces. The receptacle opening is situated in particular in an area below an operating element for turning on and off and for controlling the drive motor. The receptacle opening is preferably situated in the area of one of the two lateral surfaces of the handle, which extends essentially in parallel to the longitudinal axis of the handheld power tool. In this way, the arrangement of the receptacle opening does not interfere with the operation of the handheld power tool.

In an alternative example embodiment, the receptacle opening is situated in the area of the rear end of the housing of the handheld power tool behind the drive motor. This is advantageous in particular if the handheld power tool has a plug-in battery, which protrudes into the handle with its battery pack electronics unit and the battery cells situated in the plug-in battery. In this case, the handheld power tool only has a very limited space in the area of the handle, so that an arrangement of the receptacle opening for the interface in the area of the handle can prove to be difficult. Furthermore, due to the receptacle opening in the area of the rear end of the housing of the handheld power tool, in addition to the undisturbed operation of the handheld power tool, the holding of the handheld power tool can also take place unobstructed by the receptacle opening.

The interface preferably includes a radio module, the radio module receiving and/or transmitting a radio signal based on electromagnetic waves, for example, a Bluetooth signal, in particular a Bluetooth low energy signal, a WLAN signal, or an NFC signal. The radio module is in this case an electrotechnical component, which is used to establish a communication link via a radio network in greatly varying fields. Thus, radio modules are already used, for example, for applications in the so-called machine-to-machine (M2M) environment, for example, in the field of industrial automation, in motor vehicles for assisting applications in the field of telematics, or also for the remote access of utility meters, for example, electricity, gas, or water meters. In general, the use of a radio module enables a wireless data transmission to be carried out via a radio network, whereby in particular expenditures for wiring which is otherwise necessary are avoided. In this way, a transmission of data, parameters, or the like from and to an external interface can be reliably enabled using simple construction expenditure.

A WLAN module, for example, an 868 MHz module or a 915 MHz module, or also a Bluetooth module can be used as a preferred exemplary embodiment of such a radio module. Further types of radio modules are also usable. The radio network can be a communication network of an arbitrary wireless communication standard, for example, WLAN (wireless local area network), Bluetooth, GSM (global system for mobile communications), GPRS (general packet radio service), or UMTS (universal mobile telecommunications system). In addition, in particular in the field of industrial automation, wireless communication networks, which are especially adapted to the corresponding requirements, having a comparatively short range are increasingly being used, which are also referred to as "wireless personal area network (WPAN)." Radio networks according to one of the standards IEEE 802.15.4 or wireless HART are examples thereof.

An active radio module preferably emits a signal every eight seconds. Alternatively and as a function of the power supply, the signal can also be emitted at shorter intervals or also at longer intervals. In particular, in the case of a power supply by a second energy store, the radio signal can be emitted, for example, every 10, 20, or 30 seconds, while in contrast in the case of a power supply by the first energy store, the radio module emits a signal, for example, every four seconds or even every second. The corresponding radio module of the transmitting device can in particular be connected in series to the drive controller, a measuring device for measuring diverse tool variables, or the like. Such tool variables are, for example, the motor speed of the drive motor, a torque, a rotational direction, etc.

To be able to supply the interface with sufficient power in a simple way, according to an example embodiment of the present invention, the radio module, in particular the interface, is supplied with energy via the power supply of the handheld power tool. This is ensured with the aid of a detachable connection of the interface to the power supply and/or the energy store of the handheld power tool.

Alternatively, it is conceivable that the radio module has a separate energy store, which is situated inside the interface housing, the radio module being electrically connected to the power supply of the handheld power tool and/or to the separate energy store. In an example, the radio module, in the case in which the power supply of the handheld power tool is present and has sufficient energy, is supplied with energy via the power supply of the handheld power tool; and in any other case is supplied via the separate energy store. An energy supply of the radio module can be ensured at any time in this way.

Furthermore, it is advantageous if the energy store is connected with the aid of plug or touch contacts to the radio module, and if the interface furthermore has an elastic impact in the form of an elastic element, whereby a secure electrical contact is ensured. In principle, it can be provided that an elastic element, for example, a spring element, is situated between the cover and the energy store or between the bottom surface of the receptacle opening and the energy store, to press the energy store against the contact terminals provided inside the interface when the cover is closed. Such an energy store, for example, a coin cell battery, is advantageously replaceable. According to the present invention, this can be achieved by opening the cover, so that a user can remove the energy store through the opening from the receptacle opening and replace it with a charged energy store. The energy store is advantageously situated between the radio module and the cover and in parallel to longitudinal axis y of the handheld power tool in its main extension plane. By closing the cover again, the energy store is stored securely inside the receptacle opening. A replacement of the entire interface in addition to the radio module is avoided in this way and reliable operation of the interface is ensured in a simple manner over a long time.

Alternatively, the separate energy store can also be designed as rechargeable, the energy store being electrically connected or connectable to an energy supply of the handheld power tool, to ensure charging of the energy store. If the handheld power tool has a separate energy store in the form of a battery pack or a mains plug, the separate energy store of the interface is thus rechargeable by the energy provided by the power network or the battery pack of the handheld power tool. In this case, a control unit is advantageously provided inside the interface, which, as a function of the energy supply of the handheld power tool, charges the separate energy store of the interface and/or merely enables the energy supply of the interface via the energy supply of the handheld power tool, whereby continuous operation of the interface can be ensured in a simple way.

Furthermore, it is advantageous if the interface has at least one contact board, in this case the contact board electrically connecting the radio module and the control unit of the handheld power tool to each other and enabling a wired or wireless data exchange. Furthermore, the contact board can provide further space for accommodating additional electrical units, for example, for the above-mentioned control unit. In this regard, the contact board has at least one, preferably two connecting elements, for example, plug connectors for plug contacts, at least one connecting element ensuring the data exchange and/or the energy supply with or by the control unit of the handheld power tool and/or a further connecting element ensuring the data exchange and/or the energy supply from the contact board to the radio module via a touch contact, for example, a SIM card contact.

In an alternative example embodiment, the interface does not have a separate contact board, in this case the radio module and/or the separate energy store being electrically connected directly in a wireless or wired manner to a tool-side contact element. In another example embodiment, an arrangement of the interface inside the receptacle opening without a contact to the handheld power tool is also possible, so that the handheld power tool can be at least located with the aid of the radio module.

The interface preferably furthermore has at least one damping element, in particular a viscoelastic element, which is advantageously ring-shaped, for example, designed as an O-ring or O-web, and is elastically deformable. The damping element can be formed in one piece with the interface housing, with the receptacle opening, with the cover, and/or with the contact board, or as a separate component. The damping element is preferably situated between the cover and the contact board or the radio module. Alternatively or additionally, the damping element can also be situated between the contact board or the radio module and the bottom surface or the side wall of the receptacle opening. It is thus ensured that the interface is securely protected from external influences inside the receptacle opening and/or inside the interface housing.

The contact board is advantageously fastened inside the receptacle opening and/or inside the interface housing with the aid of latching, the retention force being able to be ensured by the damping element. The receptacle opening and/or the interface housing can accordingly have a plurality of different detent elements, with the aid of which the interface or a single component thereof can be fastened in a locked manner and largely without play in the interface housing or inside the receptacle opening.

Furthermore, it is possible that alignment elements, for example, ribs and webs, are situated inside the receptacle opening and/or on the interface or the interface housing, with the aid of which a unique arrangement and alignment of the interface or the interface housing inside the receptacle opening can be enabled. An incorrect installation can thus be prevented in a simple way.

The handheld power tool according to the present invention can also be provided in a tool system. Accordingly, a handheld power tool together with an external unit, which has a second interface, which is in turn designed for receiving pieces of information from the first interface and/or transmitting them to the first interface, also forms a further subject matter of the present invention. In an example, the external unit is a smart phone, an electronic data processing system, an electrotechnical product, for example, a portable lamp, a construction site radio, a handheld power tool, and/or a charging device.

More secure exchange of data, parameters, or the like between the handheld power tool and the external unit is enabled by this tool system using simple construction expenditure and over greater distances, whereby monitoring or change between different operating modes of the handheld power tool can be facilitated.

A handheld power tool is to be understood in general as all handheld power tools having a tool carrier which can be set into motion, for example, into rotation and/or oscillation, and which is drivable by a drive motor, for example, multi-position screwdrivers, battery-powered drills, percussion drills, multifunction tools, and/or screw drillers. Transmitting electrical energy is to be understood in this context in particular to mean that the handheld power tool is supplied with energy via a battery and/or via a power cable connection.

In principle, lithium-ion cells can be used in particular as battery cells for a battery pack, since it is possible in particular in the case of lithium-ion cells to assemble multiple battery cells into battery cell blocks, in which multiple battery cells are connected in a parallel circuit. It is particularly advantageous that the cell holder can accommodate battery cells having different diameters and lengths, whereby the use of the cell holder or the cell carrier in different battery packs may be achieved.

In an example, the electric motor is an EC motor. Such brushless EC motors are, on the one hand, nearly maintenance-free and enable a longer work time per battery charge due to their high efficiency during battery operation, whereby they are particularly efficient. Furthermore, handheld power tools including EC motors can be constructed very compactly and lightly, it being particularly advantageous that fewer heat losses also arise, whereby the devices do not become as hot as comparable devices, and therefore have longer lives.

Further features, possible applications, advantages, and designs of the present invention result from the following description of the exemplary embodiments of the present invention, which are illustrated in the figures. The description, the associated figures, and the claims contain numerous features in combination. Those skilled in the art will also consider these features, in particular also the features of various exemplary embodiments, individually and combine them into reasonable further combinations. It is to be noted that the illustrated features only have a descriptive character and can also be used in combination with features of other above-described refinements and are not intended to restrict the present invention in any form.

The present invention will be explained in greater detail hereafter on the basis of preferred exemplary embodiments with reference to the schematic drawings.

DETAILED DESCRIPTION

Figure 1:
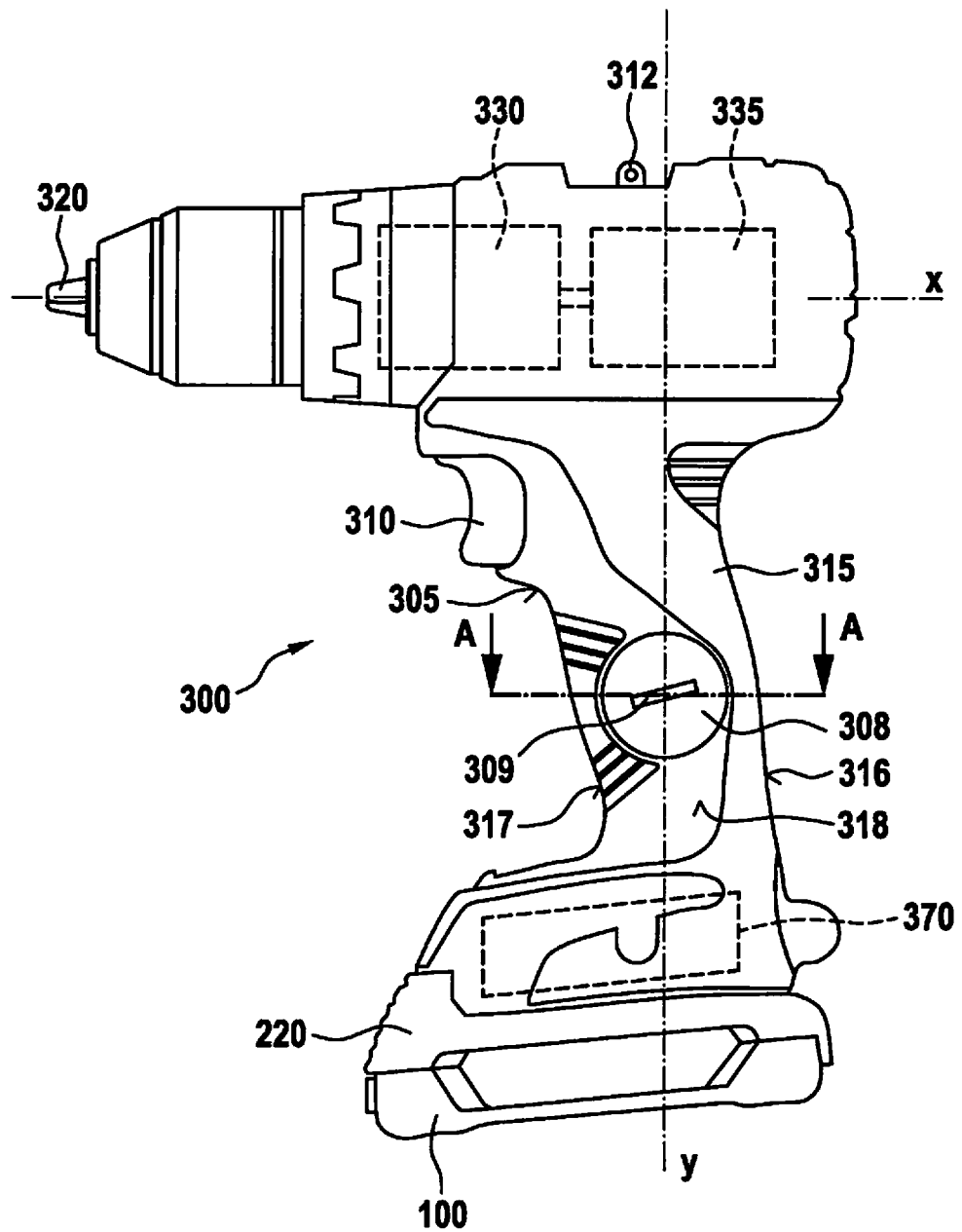
FIG. 1 shows a side view of a handheld power tool having an interface inserted into a receptacle opening according to a first example embodiment of the present invention.

FIG. 1 shows an electrical device designed as a handheld power tool 300, which is designed by way of example as a battery-powered screw driller. Handheld power tool 300 is accordingly mechanically and electrically connected to a battery pack 100 in the illustrated example embodiment for the network-independent power supply. However, it is to be noted that the present invention is not restricted to battery-powered screw drillers, but rather can be used in different handheld power tools 300 which are operated using a battery pack 100. Handheld power tool 300 includes a transmission 330 (not shown) situated in a housing 305 for transmitting a torque generated by a drive motor 335 (also not shown) to a driveshaft rotating about a rotation axis x, on which a tool receptacle 320 is fastened, and a handle 315. Handheld power tool 300 has a control unit 370 inside housing 305, which is in electronic and/or mechanical contact with drive motor 335 and/or transmission 330. Handle 315 is used as a support surface for a hand of an operator of handheld power tool 300 and generally has a longitudinal axis y, a front side 317, which faces along an axis x in the direction of tool receptacle 320, a rear side 316, and two lateral surfaces 318. Battery pack 100 shown in FIG. 1 is designed as a slide-in battery pack. During the attachment of battery pack 100 to handheld power tool 300, receptacle means provided on handheld power tool 300, for example, guide grooves and guide ribs, are engaged with corresponding guide elements 110 of battery pack 100, battery pack 100 being inserted in a sliding direction along the receptacle means of handle 315, and battery pack 100 being pushed along a lower outer surface of handle 315, which is aligned essentially perpendicularly to longitudinal direction y of handle 315, into the battery pack receptacle of a handheld power tool 300. In the position shown in FIG. 1, battery pack 100 is fastened on handle 315 of handheld power tool 300 and locked by locking means. The locking means include, for example, a locking element and an actuating element 220. By operating actuating element 220, battery pack 100 can be detached from handle 315 of handheld power tool 300.

Furthermore, handle 315 has a receptacle opening 307 for accommodating an interface 380. Interface 380 is designed for the purpose of receiving pieces of information and transmitting them to a control unit 370 situated inside housing 305 and/or to a second external interface (not shown). Receptacle opening 307 is situated in an area below an operating element 310 for turning on and off and for controlling drive motor 335 on one of the two lateral surfaces 318. In this way, the arrangement of receptacle opening 307 does not interfere with the operation of handheld power tool 300. Receptacle opening 307 is designed as pot-shaped in the example embodiment shown. Alternatively, receptacle opening 307 can have other shapes, for example, a box shape.

Pot-shaped receptacle opening 307 shown has a circumferential lateral wall 385 and a bottom surface 381. This has the advantage in particular that almost circular receptacle opening 307 additionally reinforces housing 305 of handheld power tool 300, which is basically weakened by receptacle opening 307. Receptacle opening 307 is closable with the aid of a cover 308. Cover 308 is designed as curved in such a way that it follows a contour of housing 305 and terminates flush therewith. Accordingly, cover 308 can be made of different plastic materials, for example, PA6 (Gebamid B), PA66 (Gebamid A), PC (polycarbonate), ABS (acrylonitrile-butadiene-styrene copolymer), or a material mixture of various plastics, and/or can be glass-fiber reinforced, it being advantageous if cover 308 is made of the same material as housing 305 and handle 315 of handheld power tool 300.

To enable a secure but simple access to receptacle opening 307 and interface 380 situated therein, cover 308 has a slotted depression 309. Due to slotted depression 309, cover 308 can be opened, for example, with the aid of a coin or a screwdriver. Cover 308 is detachably locked rotationally, in particular via a bayonet fitting, in the example embodiment shown in FIGS. 2 and 3. As in FIGS. 8 and 9, cover 308 can also be locked on housing 305 with the aid of at least one connecting element 306, in particular with the aid of at least one screw. According to another example embodiment (not shown) the cover 308 is a folding cover mounted so it is pivotable about a pivot axis, which can be detachably locked on housing 305 on the side opposite to the pivot axis by latching, screwing, clamping, or interlocking. Possible falling off or losing of cover 308 can be prevented by such a cover 308.

Figure 2:
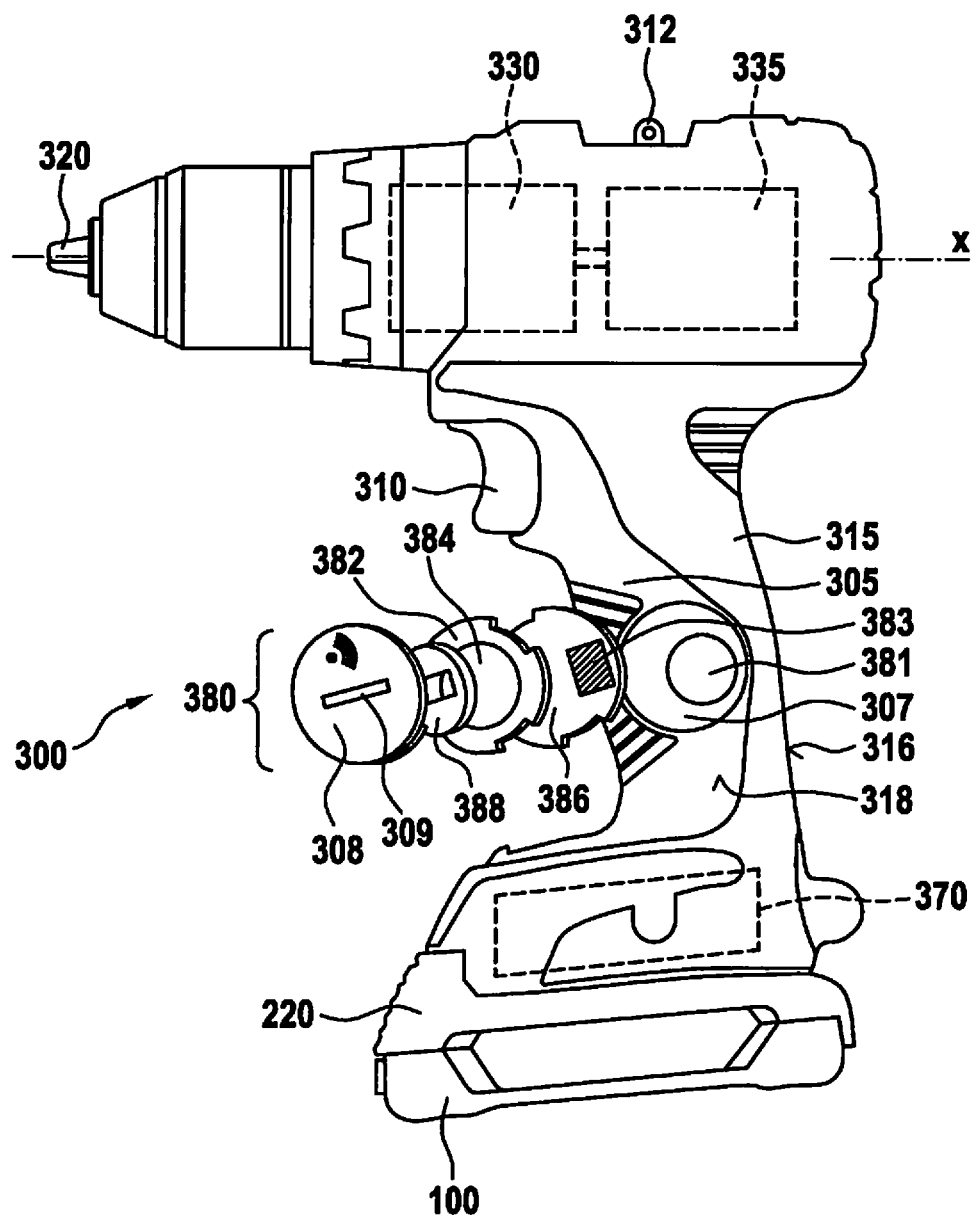
FIG. 2 shows a perspective view of the handheld power tool of FIG. 1, including an exploded view of the inserted interface, according to an example embodiment of the present invention.

FIG. 2 shows a perspective view of handheld power tool 300 from FIG. 1, in particular an interface 380 detachably inserted into receptacle opening 307 being shown in an exploded view. Interface 380 has, in the embodiment variant shown, essentially a damping element 388, a separate energy store 384, a radio module 382, a contact board 386, and, in the example embodiment shown, also cover 308.

Figure 3:
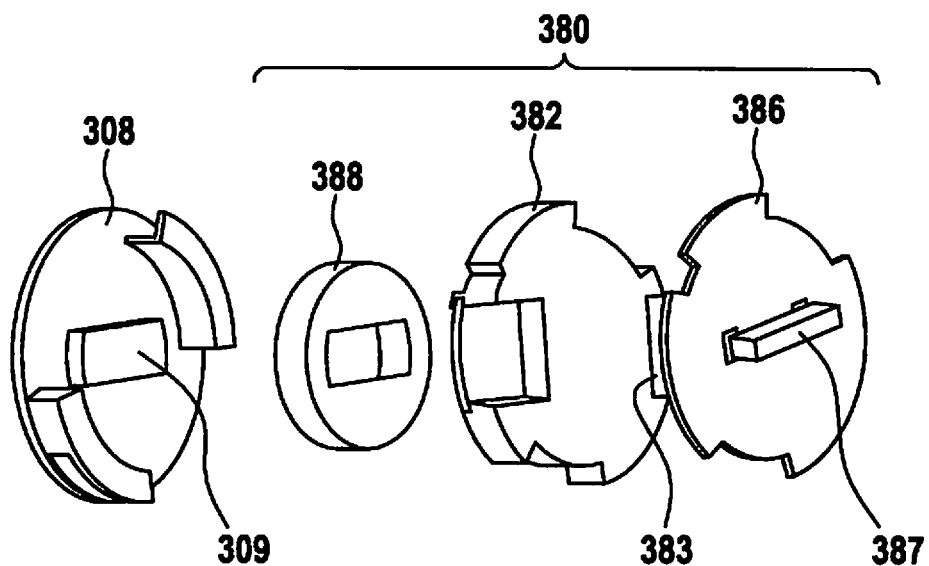
FIG. 3 shows a detail view of the interface from FIG. 2, according to an example embodiment of the present invention.
Figure 4:
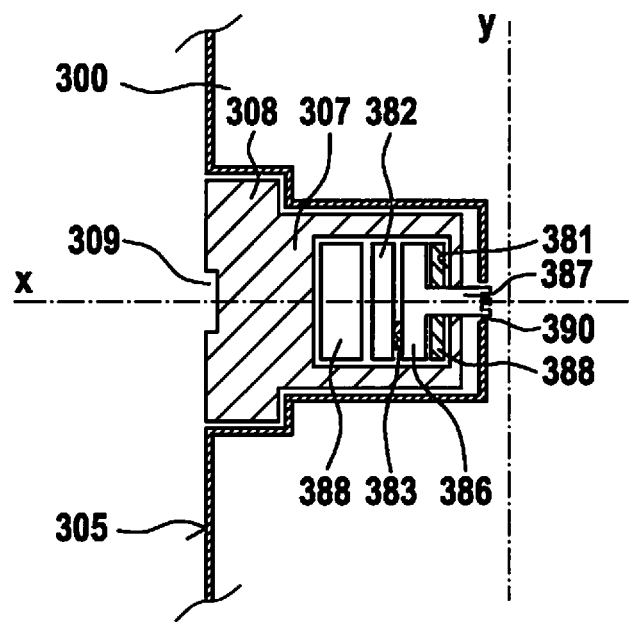
FIG. 4 shows a sectional view through a receptacle opening along axis y from FIG. 1 according to a second example embodiment of the interface of the present invention inserted into the receptacle opening.
Figure 5:
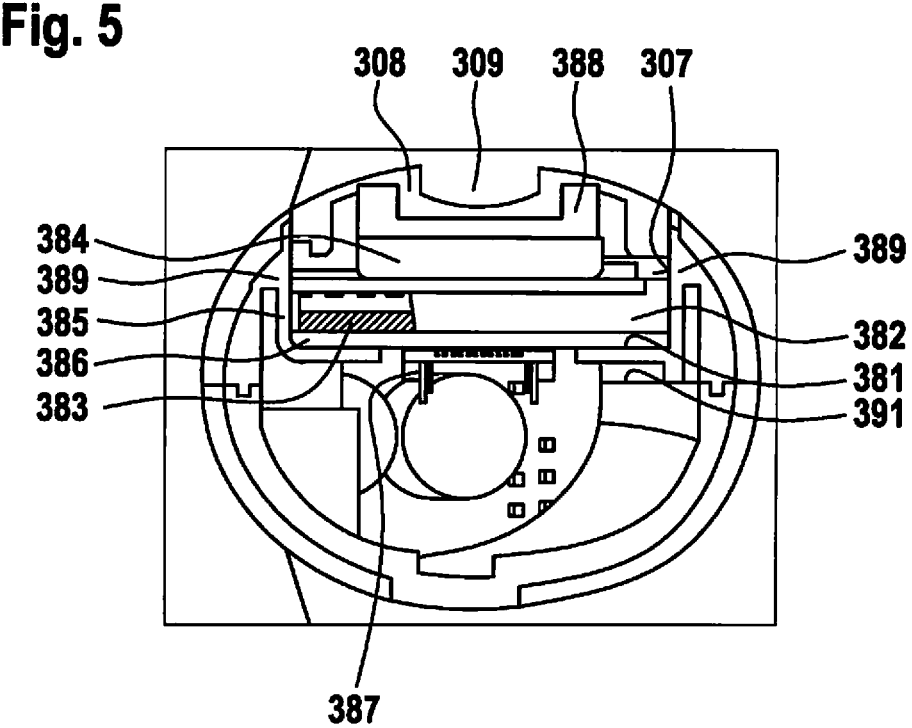
FIG. 5 shows a sectional view through a receptacle opening along line A-A from FIG. 1 including the first example embodiment of the interface inserted into the receptacle opening.
Figure 6:
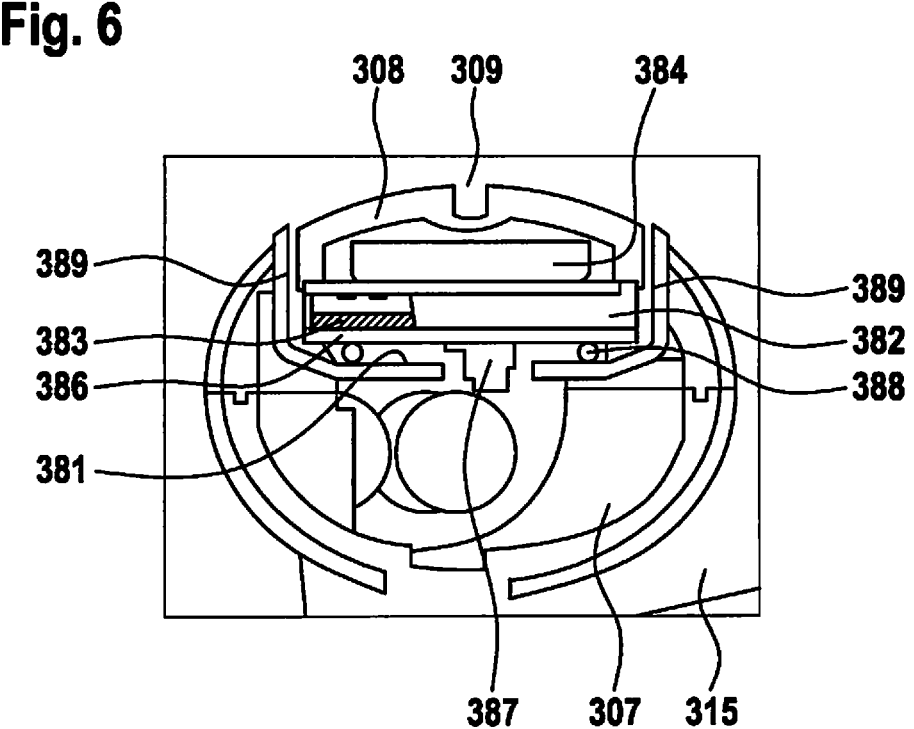
FIG. 6 shows a sectional view through a receptacle opening along line A-A from FIG. 1 including a third example embodiment of the interface of the present invention inserted into the receptacle opening.

Receptacle opening 307 can, as shown in FIGS. 3 and 5, form an interface housing 389 in one piece with housing 305. Alternatively, interface housing 389, as shown in FIGS. 4 and 6, can be formed in two pieces and can be detachably inserted as a module together with cover 308 into receptacle opening 307 of the handheld power tool. Interface housing 389 can be fastened in housing 305 of the handheld power tool or alternatively also inserted into receptacle opening 307 and solely held in receptacle opening 307 with the aid of cover 308. Interface 380 is situated largely without play, for example, with the aid of a click connection, in receptacle opening 307, whereby rattling noises or the like can be avoided and unintentional loosening of interface 380 can be prevented.

Interface housing 389 furthermore has a bottom surface 381 including at least one opening 390 for feeding through connecting elements 387, for example, at least one electrical line or a plug contact, in the direction of other electronic components, for example, control electronics unit 370 and/or battery pack electronics unit 800. Basically (not shown), however, such an opening 390 can additionally or alternatively also be formed in the area of side wall 385.

Interface 380 and in particular radio module 382 can be supplied with energy (not shown) with the aid of a detachable connection of interface 380 to the power supply and/or the energy store of handheld power tool 300. Alternatively and as shown in the figures, interface 380 has a separate energy store 384, which is designed in the example embodiment shown as a coin cell battery and is situated inside interface housing 389 directly on radio module 382 and between cover 308 and radio module 382 in its main extension plane in parallel to longitudinal axis y of handheld power tool 300.

To lock energy store 384, interface 380 has at least one elastic element, the elastic element being able to be situated, for example, in the form of a spring element between cover 308 and energy store 384 and/or between a bottom surface 381 of interface housing 389 and contact board 386, to press energy store 384 against contact terminals provided inside interface 380 when cover 308 is closed, whereby a secure electrical contact may be ensured.

Energy store 384 is replaceable, this being enabled by opening cover 308. Energy store 384 is stored securely inside receptacle opening 307 by closing cover 308. A replacement of entire interface 380 along with radio module 382 is avoided in this way and more reliable operation of interface 380 is ensured for a long time in a simple way.

Alternatively, separate energy store 384 can also be designed as rechargeable, energy store 384 being electrically connected or connectable to an energy source, for example, to battery pack 100 or the power network connection of handheld power tool 300, to ensure charging of energy store 384. Energy store 384 of interface 380 is charged and/or the energy supply of interface 380 is enabled directly via the energy supply of handheld power tool 300 as a function of the energy supply of handheld power tool 300. In this way, a continuous operation of interface 380 can be ensured in a simple manner.

FIG. 3 shows the interface from FIG. 2 in detail and from a different perspective. Radio module 382 is designed to transmit and/or receive a radio signal, for example, a Bluetooth signal, a WLAN signal, or an acoustic signal. Accordingly, radio module 382 contacts, via a wireless or wired connection, control unit 370, battery pack electronics unit 800, and/or diverse measuring units for measuring tool variables. Such tool variables are, for example, the motor speed of the drive motor, a torque, a rotational direction, etc. An active radio module 382 advantageously emits a signal every 10 seconds. Alternatively, however, the signal can also be emitted at shorter intervals, for example, every four seconds, or also longer intervals, for example, every 20 or 30 seconds.

Furthermore, contact board 386 includes electrical units, connecting elements, 383, for example, a SIM card contact, and/or a plug connector 387 to ensure the data exchange with radio module 382 and/or with control unit 370 of handheld power tool 300 and/or battery pack electronics unit 800 of battery pack 100. In an alternative example embodiment (not shown), the interface does not have a separate contact board 386, in this case radio module 382 and/or separate power supply 384 being directly electrically connected in a wireless or wired manner to a tool-side contact element.

Damping element 388 can be a viscoelastic element, which is advantageously ring-shaped, for example, designed as an O-ring or O-web, and is elastically deformable. Damping element 388 can be formed in one piece with interface housing 389, with receptacle opening 307, with cover 308, and/or with contact board 386, or as a separate component. In the embodiment variant shown in FIGS. 2 through 5, damping element 388 is situated between cover 308 and radio module 382 or energy store 384. As shown in FIG. 6 and in detail in FIG. 7, damping element 388 can also additionally be situated between contact board 386 and a bottom surface 381 of interface housing 389. Damping element 388 ensures that interface 380 is securely protected from external influences inside receptacle opening 307 and/or inside interface housing 389.

FIG. 5 shows a sectional view through receptacle opening 307 along line A-A from FIG. 1, interface housing 389 being formed in one piece with housing 305. Receptacle opening 307 is pot-shaped and includes side wall 385 and a bottom surface 381. Interface 380 from FIG. 3 is inserted into receptacle opening 307, interface 380 including cover 308, damping element 388, energy store 384, and radio module 382 and contact board 386. Furthermore, one of plug connectors 387 protrudes through opening 390 in bottom surface 381, to establish a contact with a contact element (not shown) of handheld power tool 300. Receptacle opening 307 and interface 380 are covered with the aid of detachable cover 308. Cover 308 is curved in such a way that it follows the contour of the housing wall and terminates flush therewith. Damping element 388 is situated in the embodiment variant shown in FIG. 5 between cover 308 and energy store 384.

In contrast to the second example embodiment shown in FIG. 5, the third variant shown in FIG. 6 has a sectional view through receptacle opening 307 along line A-A from FIG. 1, interface housing 389 being formed in two pieces and being inserted detachably as a module together with cover 308 into pot-shaped receptacle opening 307 of handheld power tool 300. Damping element 388 is situated in the embodiment variant shown in FIG. 6 between bottom surface 381 and contact board 386.

Figure 7:
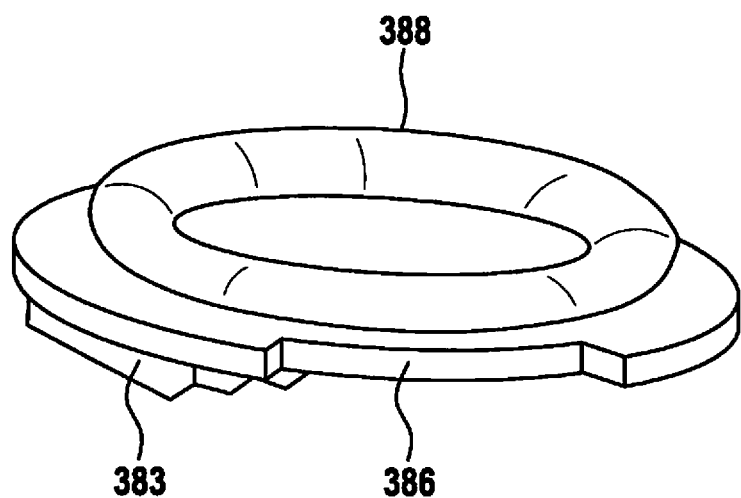
FIG. 7 shows a perspective view of a contact board of an interface according to an example embodiment of the present invention.

Contact board 386 is shown together with damping element 388 in a perspective view in FIG. 7. Damping element 388 is formed in one piece and ring-shaped and is attached directly on a first side of contact board 386. A connecting element 383 is situated on a second side of contact board 386.

Figure 8:
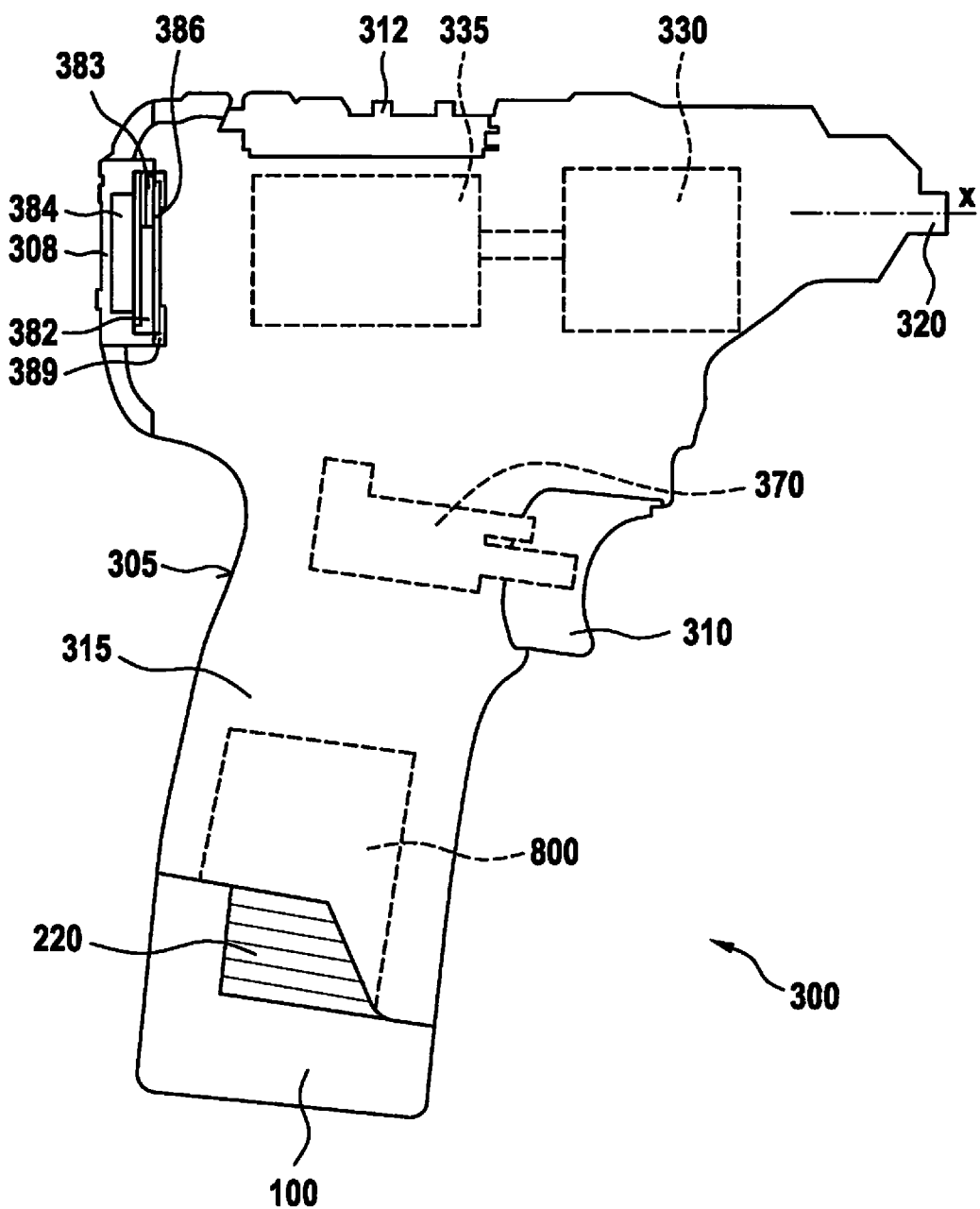
FIG. 8 shows a side view of a handheld power tool according to a fourth example embodiment of an inserted interface of the present invention.
Figure 9:
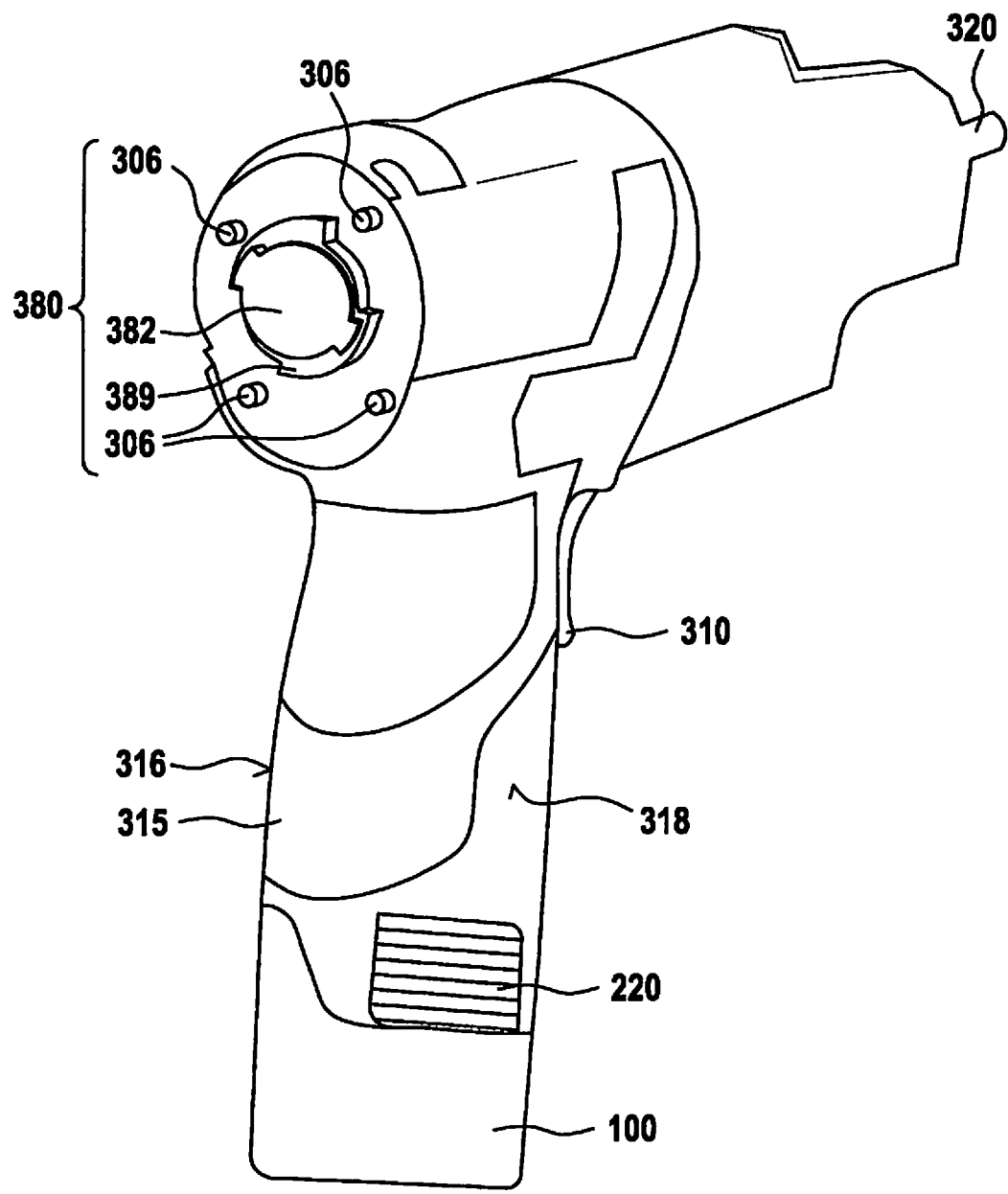
FIG. 9 shows a perspective view of the handheld power tool of FIG. 8 including a removed cover, according to an example embodiment of the present invention.

FIG. 8 shows a side view of a handheld power tool 300 according to the present invention having a fourth example embodiment of an inserted interface 380. Receptacle opening 307 is situated in the area of the rear end of housing 305 of handheld power tool 300 behind drive motor 335. This is advantageous in particular if handheld power tool 300 has a plug-in battery pack 100 as shown, which protrudes into handle 315 with its battery pack electronics unit 800 and the battery cells situated in plug-in battery pack 100. In this case, handheld power tool 300 only has a very limited space in the area of the handle, so that arranging receptacle opening 307 for accommodating interface 380 in the area of handle 315 can prove to be difficult. Cover 308 is detachably fastened with the aid of screws 383 on housing 305 of handheld power tool 300 in this variant. As is apparent in FIG. 9, energy store 384 is situated on radio module 382 directly below cover 308. By way of such an arrangement of interface 380, in addition to the undisturbed operation of hand-held power tool 300, the holding of handheld power tool 300 can also take place unobstructed.

In addition to the specific embodiments described and shown, further specific embodiments are conceivable, which can include further modifications and combinations of features.

What is claimed is:

1. A handheld power tool comprising:
 a housing that include a handle and in which a receptacle opening is formed;
 a drive motor situated in the housing; and
 a first interface removably situated in the receptacle opening and configured to at least one of receive from and transmit to at least one second external interface pieces of information, wherein the receptacle opening is closable by a cover that is detachably lockable at an exterior of the housing,
 wherein the receptacle opening is situated on a lateral surface of the handle.

2. The handheld power tool of claim 1, further comprising an interface housing for accommodating the first interface and situated in the receptacle opening.

3. The handheld power tool of claim 2, wherein the interface housing is formed in one piece with the housing of the handheld power tool.

4. The handheld power tool of claim 2, wherein the housing of the power tool and the interface housing are formed as two pieces.

5. The handheld power tool of claim 2, wherein the interface housing together with the first interface and the cover form a module that is detachably attachable in the receptacle opening.

6. The handheld power tool of claim 1, wherein the cover has a slotted depression.

7. The handheld power tool of claim 1, wherein the cover is rotationally lockable onto the housing.

8. The handheld power tool of claim 1, wherein the cover is rotationally lockable onto the housing via a screw cap.

9. The handheld power tool of claim 1, wherein the cover is rotationally lockable onto the housing via a flap closure.

10. The handheld power tool of claim 1, wherein the cover is rotationally lockable onto the housing via a bayonet fitting.

11. The handheld power tool of claim 1, wherein the cover is rotationally lockable onto the housing via at least one connecting element.

12. The handheld power tool of claim 1, wherein the cover is rotationally lockable onto the housing by at least one screw.

13. The handheld power tool of claim 1, wherein the first interface includes a radio module.

14. The handheld power tool of claim 1, wherein the first interface includes an energy store that is separate from a power supply that powers operation of the handheld power tool.

15. The handheld power tool of claim 14, wherein the energy store is at least one of replaceable and rechargeable.

16. The handheld power tool of claim 1, wherein the first interface is supplied with energy via a power supply of the handheld power tool.

17. The handheld power tool of claim 1, wherein the first interface includes at least one contact board.

18. The handheld power tool of claim 1, wherein the first interface is connected in a wired or wireless manner for data exchange with at least one of a control unit and a battery pack electronics unit of a battery pack.

19. The handheld power tool of claim 1, wherein the first interface includes at least one damping element.

20. The handheld power tool of claim 19, wherein the damping element is situated between the cover and a radio module.

21. The handheld power tool of claim 19, further comprising an interface housing for accommodating the first interface and situated in the receptacle opening, wherein the damping element is situated between the first interface and a bottom surface of the interface housing.

22. The handheld power tool of claim 1, wherein the first interface includes at least one viscoelastic damping element.

23. The handheld power tool of claim 1, wherein the first interface is configured to at least one of receive and transmit a radio signal, a Bluetooth signal, a WLAN signal, an optical signal, or an acoustic signal.

24. A tool system comprising:
 a handheld power tool; and
 a unit that includes a first interface;
 wherein the handheld power tool includes:
  a housing that include a handle and in which a receptacle opening is formed;
  a drive motor situated in the housing; and
  a second interface removably situated in the receptacle opening and configured to at least one of receive from and transmit to first interface pieces of information, wherein the receptacle opening is closable by a cover that is detachably lockable at an exterior of the housing,
  wherein the receptacle opening is situated on a lateral surface of the handle.

25. The tool system of claim 24, wherein the unit that includes the first interface is a smart phone or an electronic data processing system.

26. A handheld power tool comprising:
 a housing that include a handle and in which a receptacle opening is formed;
 a drive motor situated in the housing; and
 a first interface removably situated in the receptacle opening and configured to at least one of receive from and transmit to at least one second external interface pieces of information, wherein the receptacle opening is closable by a cover that is detachably lockable at an exterior of the housing, wherein the receptacle opening is situated in an area of a rear end of the housing of the handheld power tool behind the drive motor, wherein the first interface includes an energy store and a radio module, wherein the energy store is situated on the radio module below the cover.

27. The handheld power tool of claim 26, wherein the cover is detachably fastened via screws on the housing of the handheld power tool.

28. A tool system comprising:
a handheld power tool; and
a unit that includes a first interface;
wherein the handheld power tool includes:
    a housing that include a handle and in which a receptacle opening is formed;
    a drive motor situated in the housing; and
    a second interface removably situated in the receptacle opening and configured to at least one of receive from and transmit to the first interface pieces of information, wherein the receptacle opening is closable by a cover that is detachably lockable at an exterior of the housing, wherein the receptacle opening is situated in an area of a rear end of the housing of the handheld power tool behind the drive motor, wherein the first interface includes an energy store and a radio module, wherein the energy store is situated on the radio module below the cover.

\* \* \* \* \*